United States Patent Office 3,503,927
Patented Mar. 31, 1970

3,503,927
THERMOPLASTIC POLYURETHANE ELASTOMERS
Eugene Yue Chieh Chang and Samuel Kaizerman, Bridgewater Township, Somerset County, N.J., assignors to American Cyanamid Company, Stamford, Conn., a corporation of Maine
No Drawing. Filed June 7, 1968, Ser. No. 735,201
Int. Cl. C08g 22/04, 22/08
U.S. Cl. 260—47                                                6 Claims

ABSTRACT OF THE DISCLOSURE

An improved thermoplastic polyurethane elastomer containing a cross-linked network structure wherein the cross-linking is labile to heat. The cross-linking is provided by reaction between a diol having a phenolic substituent and isocyanate groups present in the polyurethane prepolymer.

---

This invention relates to novel thermoplastic, polyurethane elastomers. More particularly, it relates to a method of making thermoplastic, polyurethane elastomers containing a cross-linked network structure wherein the cross-linking is labile to heat. It relates further to the curing of polyurethane prepolymers using a diol having a phenolic substituent as the curing agent.

Polyurethane elastomers have been known for a considerable number of years. Thermoplastic polyurethane elastomers in particular have been of more recent interest. Such elastomers are desirable because of an unusually good combination of mechanical properties, and adaptability to a wide range of use requirements.

Thermoplastic polyurethane elastomers are generally based on the formation of a "prepolymer." As employed in the polyurethane art, and in this specification as well, the term "prepolymer" is intended to mean a low molecular weight (generally below 5000) reaction product of a molar excess of an organic diisocyanate compound with either (1) a hydroxy-terminated polyester or (2) a hydroxy-terminated polyether or (3) a combination of (1) and (2). The prepolymers are isocyanate-terminated as a result of the use of the above-mentioned molar excess of diisocyanate, and are usually viscous liquids or low-melting, wax-like solids.

Thermoplastic elastomers have been heretofore obtained when such a prepolymer was "cured" or "chain-extended" to a high molecular weight polymer with a stoichiometric quantity of a difunctional organic copound reactive with the terminal isocyanate groups. The compounds most commonly used as curatives in the preparation of thermoplastic polyurethane elastomers were diols such as for example 1,4-butanediol, 1,6-hexane-diol or hydroquinone bis(hydroxyethyl)ether, commonly referred to as PEHQ. Thermoplasticity was correlated to a lack of substantial cross-linking in the polymer. Thus, these thermoplastic polyurethanes are normally substantially linear, relatively low melting structures. They are capable of repeated extrusion, injection or compression-molding and milling without excessive thermal breakdown, decomposition or loss of mechanical properties. They can be processed, with perhaps slight modifications, by the well-known techniques used for other thermoplastic materials such as polystyrene, polyethylene, polypropylene, etc.

One of the problems inherent in the conventional linear thermoplastic polyurethane elastomers is the relatively slow recovery of elastomeric properties following mechanical and thermal treatment (milling, extrusion, etc.), probably as a result, mainly, of the slow realignment (due to chain entanglements, etc.) of polymer chains to reform the strong secondary or Van der Waals forces which are the major contributor to the good mechanical properties of linear polyurethane elastomers. Another deterrent to the acceptance of these polymers is the high degree of "set" which results when the polymer is subjected to stress (i.e., either from stretching or compressive force). This is a phenomenon related to the recovery of the polymer as discussed above. Set, for example, sometimes is found to be as high as 100%. Recovery from this deformation is usually slow under normal temperature conditions and constitutes a severe limitation to the use of the elastomer. A detailed discussion of the forces at work in the determination of properties as related to structural features in the polymer is beyond the scope of this specification, but an excellent review of this relationship can be found in Saunders and Frisch, Polyurethanes: Chemistry and Technology, Part I, pages 261–346 (Interscience Publishers, 1962).

Speedy recovery of mechanical properties (e.g. improved set characteristics) can be aided by the incorporation into the normally linear polymer structure of a small degree of cross-linking. This is a well-known structure-property relationship. However, conventional cross-linking is a structural feature that is inconsistent with thermoplasticity. Polymers containning a cross-linked structure are normally considered thermosetting. Attempts to incorporate "primary" chemical cross-links into a thermoplastic polyurethane elastomer via the formation of some degree of allophanate linkages as a result of using less than a stoichiometric quantity of curative, have been made. The resulting polymer has relatively limited processability. What is needed, therefore, is a means of obtaining polyurethane elastomers which are thermoplastic and yet characterized by good recovery of mechanical properties after thermal treatment.

It is accordingly an object of this invention to provide a means for obtaining a processable thermoplastic, polyurethane elastomer containing thermally labile cross-links. It is a further object of this invention to provide the thermoplastic composition which results from this method. Other objects will be apparent from the ensuing description of this invention.

The present invention is based on the discovery that a thermoplastic, polyurethane elastomer with good set characteristics is obtained by curing a prepolymer with a diol compound containing at least one phenolic substituent. Such compounds should be free of other groups reactive with an isocyanate, as for example, thiol carboxyl amino groups.

One class of useful phenolic diols is represented by the Formula I:

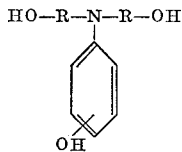

wherein R is lower-alkyl (especially alkyl of 2–4 carbon atoms). Among the compounds represented by Formula I containing both aliphatic and phenolic hydroxy groups are: N,N-di-(2-hydroxyethyl)-p-hydroxyaniline, N,N-di-(2-hydroxypropyl)-p-hydroxyaniline, N,N-di-(2 - methyl-2-hydroxypropyl)-p-hydroxyaniline, N,N-di - (2 - hydroxyethyl)-meta-hydroxyaniline, N,N-di-(2 - hydroxyethyl)-0-hydroxyaniline, and the like.

Thermally labile urethane groups are formed when the phenolic substituent reacts with an isocyanate group. The labile urethane groups thus formed are reversible to the original phenolic and isocyanate groups. The urethane linkages formed from the reaction of the aliphatic hydroxyl and isocyanate groups are stable. Advantage is thus taken of the labile nature of the phenolic urethane group in providing sites for cross-linking and the thermal stability of the aliphatic hydroxyl urethane group.

Polyurethane elastomers of the present invention have the advantage, therefore, of being thermoplastic according to the usually accepted definition of the word while at the same time, possessing the desirable features of a cross-linked, network structure, viz: a more rapid recovery of mechanical properties and improved set characteristics after thermal treatment.

Any type of polyurethane prepolymer can be cured by the practice of this invention. Prepolymers can be derived from polymeric glycols which have a molecular weight of at least 500 and normally less than about 5000, preferably about 600 to 3000. Useful glycols can be either polyester glycols or polyalkylene ether glycols. The polyester glycols are the condensation products of diols of about two to ten carbon atoms and dicarboxylic acids of about two to eight carbon atoms in each alkylene chain. The alkylene linkages in both the polyesters or polyethers may be straight or branch-chained. Typical glycolic polyesters include those prepared from (1) glycols such as ethylene glycols, propylene glycol-1,2, propylene glycol-1,3, butylene glycol-1,4, decamethylene glycol and mixtures thereof, and (2) dicarboxylic acids, such as succinic, glutaric acid, adipic acid, pimilic acid, suberic acid, azelaic acid, sebacic acid and mixtures thereof.

Typical glycolic polyethers include polyethylene ether glycol, polytetramethylene ether glycol, poly-1,2-dimethylethylene ether glycol and mixtures thereof.

The diisocyanates of use in the preparation of prepolymers curable by this invention include all the diisocyanates normally used in making polyurethanes. The preferred diisocyanates are the aromatic diisocyanates. The present invention will be illustrated with respect to prepolymers prepared from TODI (3,3'-dimethyl-4,4'-biphenylene diisocyanate) since this is representative of useful diisocyanates. Other suitable aromatic diisocyanates especially include 2,4-tolylenediisocyanate, 2,6-tolylenediisocyanate and mixtures thereof, m-phenylene diisocyanate, m-xylylene diisocyanate, etc. Non-aromatic diisocyanates such as hexamethylenediisocyanate, bis(2-isocyanatoethyl)carbonate and the like may also be used.

The reaction between the polymeric glycol and the diisocyanate to give the prepolymer is carried out in a conventional manner. Stabilizers, solvents, adjuvants, etc. may be added if desired. The prepolymers thus obtained can be cured by reaction with a phenolic glycol or a mixture of a phenolic glycol and at least one non-phenolic glycol, such as hydroquinone bis(hydroxyethyl) ether (PEHQ), butanediol-1,4, hexamethylene glycol, etc.

The amount of curative used in chain-extending the prepolymers is normally a stoichiometric amount, i.e., the amount sufficient to react with all the isocyanate groups. One of the advantages of the compounds of the present invention rests in the flexibility which they permit in designing thermoplastic structures for particular requirements. Thus, a phenolic glycol may be used as the sole curative for the prepolymer. Depending on the degree of cross-linking desired, from 1 to 100% of the phenolic hydroxyl groups may be reacted with the isocyanate groups of the prepolymer in addition to all of the aliphatic hydroxyl groups. Similarly, mixed curatives may be used, e.g., a mixture of a phenolic glycol and hydroquinone bis(hydroxyethyl)ether, and the reaction stoichiometry adjusted in a manner as described above. Normally, improved properties are obtained by using a phenolic glycol to supply at least one percent of the total curative requirements and by reacting essentially all of the phenolic groups therein to provide phenolic urethane cross-links.

In order to facilitate the reaction of the phenolic hydroxyl group with the isocyanate, it is generally desirable that a catalyst be used. Tertiary amines have been found to be efficient catalysts. A preferred catalyst is dimethyldodecylamine. When used to promote the reaction, the catalyst is used at a concentration of about 0.1 to 1.0%, based on the weight of the reactants.

The reactants, including the catalyst, are thoroughly mixed for a few minutes at a suitable temperature permitting a low viscosity and then poured into a suitable container or mold, and cured. The composition may be cured either at a moderately elevated temperature, 100–120° C. for about 10 hours, or for a few hours at 100–120° C. followed by a longer period of time at some lower temperature, 70–80° C. The time and the temperature of curing are readily determined by conventional techniques known to those skilled in the polyurethane art. The resultant polymer may be milled on a conventional mill, extruded or injection molded. If desired, other compounding ingredients, such as antioxidants or fillers, may be added during the curing step or at some subsequent time, such as during milling.

The invention is more fully illustrated by the examples which follow.

EXAMPLE 1 p-Aminophenol, 55 grams, 0.5 mole, ethylene chlorohydrin, 125 grams, 1.55 moles and sodium carbonate, 26.5 grams, 0.25 mole, were refluxed for 4.5 hours and the reaction mixture then poured into 300 ml. of a saturated sodium carbonate solution and cooled. The precipitate was filtered off and washed with sodium bisulfite solution and then water. The product was recrystallized from water which afforded 60 grams of 2,2'-(p-hydroxyphenylimino)ethanol, M.P. 140–142° C. Reference: C. H. Hwang, Chemical Abstracts 52, 15509a (1958).

This example illustrates the preparation of one of the curatives useful in the present invention.

EXAMPLE 2

To 131 grams (0.086 eq.) of a prepolymer containing 2.74% NCO (prepared from polyethylene adipate and 3,3'-di-methyl-4,4'-biphenylene diisocyanate) were added 8.28 grams (98% of the NCO eq.) of PEHQ and 0.28 gram (0.2% based on the weight of the reactants) of dimethyldodecylamine. The ingredients were mixed and cured for one hour at 100° C. and then overnight at 75° C. The resulting polymer was treated as described below.

(A) Molded into 75 mil sheets by pressing for 3–5 minutes @ 360° F. and cooled.

(B) Molded several times successively under the same conditions as in A.

The molded sheets A and B were tested for the mechanical properties using an Instron tester. Results are shown in the accompanying table.

| | Hardness Shore A | Modulus, p.s.i. | | | Tensile, p.s.i. | Elongation, percent | Break set, percent | Die C tear strength (p.l.i.)* |
| --- | --- | --- | --- | --- | --- | --- | --- | --- |
| | | 100% | 300% | 500% | | | | |
| A | 78 | 500 | 900 | 1,800 | 4,125 | 850 | 24 | 476.7 |
| B | 77 | 500 | 950 | 1,750 | 3,775 | 790 | 25 | 484.4 |

*ASTM Method No. D-624-54.

This example illustrates the properties, especially percent break set, which are obtained with conventional thermoplastic polyurethanes where the only cross-linking is of the allophanate type. It also illustrates the slight loss of properties on repeated moldings at elevated temperatures.

EXAMPLE 3

To 200 grams (0.131 eq.) of the prepolymer used in Example 2 were added 11.60 grams (90% of the NCO eq.) of alpha, alpha'-dihydroxy - 4,4' - diethoxybenzene (PEHQ) and 0.86 gram (10% of the NCO eq.) of 2,2'-(p-hydroxyphenylimino)diethanol (HPID) and 0.21 gram (0.1% based on the weight of the reactants) of dimethyldodecylamine. The ingredients were mixed and cured for 2 hours @ 100° C. and then overnight @ 75° C. The resulting polymer was then treated as in Example 2. Results are shown in the accompanying table.

| Hardness Shore A | Modulus, p.s.i. 100% | 300% | 500% | Tensile, p.s.i. | Elongation, percent | Break set, percent | Die C tear strength (p.l.i.)* |
|---|---|---|---|---|---|---|---|
| A | 76 | 450 | 900 | 2,175 | 5,800 | 740 | 6 | 432.2 |
| B | 76 | 450 | 925 | 2,100 | 5,200 | 740 | 9 | 466.9 |

*ASTM Method No. D-624-54.

This example illustrates the superior break set properties of the composition of the present invention using the novel curative. The improvement in mechanical properties, as a result of the cross-linked structure, is apparent. Additionally, as shown in B, the composition may be repeatedly molded, without serious effect, like conventional thermoplastics.

EXAMPLE 4

To 290 grams (0.189 eq.) of the prepolymer of Example 2 were added 16.8 grams (90% of the NCO eq.) of alpha, alpha'-dihfdroxy - 4,4' - diethoxybenzene (PEHQ), 1.25 grams (10% of the NCO eq.) of 2,2'-(p-hydroxyphenylimino)diethanol (HPID), 1.5 grams (0.5% by weight) of Antioxidant 2246 and 0.15 gram (0.05% by weight) of dimethyldodecylamine. The ingredients were mixed and cured for 2 days @ 75° C. The resulting polymer was preheated in a press @ 350° F. and then milled for 5 minutes on a rubber mill @ 100-110° C. The milled polymer was then molded into sheets as described in Example 2. The cured sheets were tested with the following results:

| Hardness Shore A | Modulus, p.s.i. 100% | 300% | 500% | Tensile, p.s.i. | Elongation, percent | Break set, percent | Die C Tear strength (p.l.i.)* |
|---|---|---|---|---|---|---|---|
| 75 | 375 | 775 | 1,700 | 4,450 | 800 | 15 | 317.2 |

*ASTM Method No. F-624-54.

This example demonstrates that the cross-linked polymer can be successfully milled on conventional rubber processing equipment without excessive breakdown and recover most of the desirable properties. Especially note the improved break set.

EXAMPLE 5

To 315 grams (0.206 eq.) of the prepolymer of Example 2 were added 18.3 grams (90% of the NCO eq.) of alpha, alpha'-dihydroxy - 4,4' - diethoxybenzene (PEHQ), 1.36 grams (10% of the NCO eq.), 2,2'-(p-hydroxyphenylimino)diethanol (HPID), and 0.33 gram (0.1% on the weight of reactants) of dimethyldodecylamine. The ingredients were mixed and cured for 1 hour @ 100° C. and then for 3 days @ 75° C. The resulting polymer was preheated in a press @ 350° F. for 10 minutes and milled on a rubber mill for 30 minutes at 100-120° C. The milled polymer was then molded into sheets as described in Example 2 with the following results:

| Hardness Shore A | Modulus, p.s.i. 100% | 300% | 500% | Tensile, p.s.i. | Elongation, percent | Break Set, percent | Die C tear strength (p.l.i.)* |
|---|---|---|---|---|---|---|---|
| 75 | 375 | 850 | 2,125 | 4,950 | 710 | 9 | 400.8 |

*ASTM Method No. D-624-54.

This example illustrates the excellent properties of the polymer even after extensive milling on conventional rubber equipment. Especially indicative of the advantages of the polyfunctional curative of this invention is the low break set data which illustrates the rapid reformation of cross-linking after milling.

We claim:

1. A thermoplastic polyurethane elastomer having recurring linkages derived from the reaction of (a) an isocyanate-terminated polyurethane prepolymer prepared by reaction of an organic diisocyanate with a hydroxy-terminated polyester, hydroxy-terminated polyether, or mixture of said polyester and polyether, with a stoichiometric amount of (b) a glycol mixture comprising at least 1% by weight of a phenolic glycol of the formula:

$$HO-R-N-R-OH$$

(attached to a benzene ring bearing an OH group)

wherein R is alkyl of 2-4 carbon atoms.

2. The thermoplastic polyurethane elastomer of claim 1 wherein R of the glycol formula is ethyl.

3. The thermoplastic polyurethane elastomer of claim 1 wherein R of the glycol formula is propyl.

4. The thermoplastic polyurethane elastomer of claim 1 wherein the prepolymer (a) is an isocyanate-terminated polyester of molecular weight below about 5000.

5. The thermoplastic polyurethane elastomer of claim 1 wherein the prepolymer (a) is an isocyanate-terminated polyether of molecular weight below about 5000.

6. The thermoplastic polyurethane elastomer of claim 1 wherein the glycol mixture (b) contains hydroquinone bis(hydroxyethyl)ether.

References Cited

UNITED STATES PATENTS 3,044,991 7/1962 Muller et al. _____ 260—77.5
3,063,964 11/1962 Khawam _____ 260—47
3,282,896 11/1966 Einberg _____ 260—47

WILLIAM H. SHORT, Primary Examiner

L. L. LEE, Assistant Examiner

U.S. Cl. X.R.

260—75, 77.5